United States Patent
Dacier et al.

(10) Patent No.: US 7,437,762 B2
(45) Date of Patent: Oct. 14, 2008

(54) METHOD, COMPUTER PROGRAM ELEMENT AND A SYSTEM FOR PROCESSING ALARMS TRIGGERED BY A MONITORING SYSTEM

(75) Inventors: Marc Dacier, Mouans Sartoux (FR); Klaus Julisch, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 10/287,132

(22) Filed: Nov. 1, 2002

(65) Prior Publication Data

US 2003/0110398 A1 Jun. 12, 2003

(30) Foreign Application Priority Data

Nov. 29, 2001 (EP) ................................ 01811155

(51) Int. Cl.
*G06F 11/00* (2006.01)
*G06F 12/14* (2006.01)
*G06F 12/16* (2006.01)
*G06F 15/18* (2006.01)
*G08B 23/00* (2006.01)
*G06F 15/173* (2006.01)

(52) U.S. Cl. ............................ 726/25; 726/23; 726/24; 709/224; 709/225

(58) Field of Classification Search .................. 726/23, 726/11; 709/224
See application file for complete search history.

(56) References Cited

U.S. PATENT DOCUMENTS

| | | | | |
|---|---|---|---|---|
| 6,691,231 B1* | 2/2004 | Lloyd et al. ..................... | 726/5 |
| 6,804,701 B2* | 10/2004 | Muret et al. ................. | 709/203 |
| 6,918,124 B1* | 7/2005 | Novik et al. ................. | 719/318 |
| 2002/0012011 A1* | 1/2002 | Roytman et al. ............ | 345/736 |
| 2003/0028631 A1* | 2/2003 | Rhodes ....................... | 709/224 |
| 2003/0070084 A1* | 4/2003 | Satomaa et al. ............. | 713/200 |
| 2003/0108042 A1* | 6/2003 | Skillicorn et al. ........... | 370/389 |
| 2004/0034794 A1* | 2/2004 | Mayer et al. ................. | 713/200 |
| 2008/0016569 A1* | 1/2008 | Hammer et al. ................ | 726/23 |

OTHER PUBLICATIONS

Sinclair, C.; Pierce, L.; Matzner, S. "An application of machine learning to network intrusion detection". In Proceedings of the 15th Annual Computer Security Applications Conference, 1999. (ACSAC '99). Dec. 6-10, 1999, pp. 371-377.*

(Continued)

*Primary Examiner*—Ayaz Sheikh
*Assistant Examiner*—Arezoo Sherkat
(74) *Attorney, Agent, or Firm*—Scully, Scott, Murphy & Presser, P.C.; Eustus D. Nelson, Esq.

(57) ABSTRACT

A method and system is designed for processing alarms, that have been triggered by a monitoring system such as an intrusion detection system, a firewall, or a network management system, comprising the steps of entering the triggered alarms into an alarm log, evaluating similarity between alarms, grouping similar alarms into alarm clusters, summarizing alarm clusters by means of generalized alarms, counting the covered alarms for each generalized alarm and forwarding generalized alarms for further processing if the number of alarms covered satisfies a predetermined criterion.

15 Claims, 5 Drawing Sheets

OTHER PUBLICATIONS

Perrochon, L.; Eunhei Jang; Kasriel, S.; Luckham, D.C. "Enlisting event patterns for cyber battlefield awareness". In Proceedings of DARPA Information Survivability Conference and Exposition, 2000. DISCEX '00. vol. 2, Jan. 25-27, 2000 pp. 411-422 vol. 2.*

F. Cuppens, "Managing Alerts in a Multi-Intrusion Detection Environment," acsac, p. 0022, 17th Annual Computer Security Applications Conference (ACSAC'01), 2001.*

S. Staniford-Chen, S. Cheung, R. Crawford, M. Dilger, J. Frank, J. Hoagland, K. Levitt, C. Wee, R. Yip, and D. Zerkle. GrIDS—a graph based intrusion detection system for large networks. In Proceedings of the 19th National Information Systems Security Conference, vol. 1, pp. 361-370, Oct. 1996. http://citeseer.ist.psu.edu/article/staniford.*

* cited by examiner

FIGURE 7

CLUSTER LOG G

| ALARM TYPE AT | SOURCE PORT | SOURCE IP | DESTINATION PORT | DESTINATION IP | TIME | CONTEXT | SIZE |
|---|---|---|---|---|---|---|---|
| 1 | NON-PRIV | EXTERN | 80 | ip 4 | ANY | see text | 54310 |
| 1 | NON-PRIV | EXTERN | 80 | ip 5 | ANY | see text | 54013 |
| 1 | NON-PRIV | FIREWALL | 80 | EXTERN | ANY | ANY | 17830 |
| 2 | NON-PRIV | FIREWALL | 21 | EXTERN | ANY | ANY | 6439 |
| 2 | NON-PRIV | EXTERN | 21 | WWW/FTP | ANY | ANY | 4181 |
| 3 | UNDEFINED | ip 6 | UNDEFINED | ip 1 | WORKDAY | UNDEFINED | 4581 |
| 3 | UNDEFINED | ip 6 | UNDEFINED | ip 2 | WORKDAY | UNDEFINED | 3708 |
| 4 | NON-PRIV | ip 1 | 80 | ANY | ANY | UNDEFINED | 761 |
| 4 | NON-PRIV | ip 2 | 80 | ANY | ANY | UNDEFINED | 663 |
| 4 | NON-PRIV | FIREWALL | 25 | ANY | ANY | UNDEFINED | 253 |
| 5 | UNDEFINED | EXTERN | UNDEFINED | ip 4 | ANY | UNDEFINED | 823 |
| 5 | UNDEFINED | EXTERN | UNDEFINED | ip 5 | ANY | UNDEFINED | 711 |
| 6 | UNDEFINED | ip 7 | UNDEFINED | FIREWALL | END-OF-MONTH, TUESDAY | UNDEFINED | 861 |

AT 1 ≡ "WWW IIS View Source Attack"  
AT 2 ≡ "FTP SYST Command Attempt"  
AT 3 ≡ "IP Fragment Attack"  
AT 4 ≡ "TCP SYN Host Sweep"  
AT 5 ≡ "Fragmented ICMP Traffic"  
AT 6 ≡ "Unknown Protocol Field in IP Packet"

METHOD, COMPUTER PROGRAM ELEMENT AND A SYSTEM FOR PROCESSING ALARMS TRIGGERED BY A MONITORING SYSTEM

The present invention generally relates to a method, a computer program element and a system for processing alarms that have been triggered by a monitoring system such as an intrusion detection system, a firewall or a network management system.

The present invention specifically relates to a method and a system for processing alarms triggered by a host or network intrusion detection system, operating by means of behavior-based or knowledge-based detection, in order to extract information about the state of the monitored system or activities of its users.

More particularly, the present invention relates to a method and a system for processing alarms, possibly containing a high percentage of false alarms, which are received at a rate that can not be handled efficiently by human system administrators.

This invention is related to an invention disclosed in a copending U.S. application Ser. No. 10/286,708 entitled "METHOD, COMPUTER PROGRAM ELEMENT AND A SYSTEM FOR PROCESSING ALARMS TRIGGERED BY A MONITORING SYSTEM", filed in the name of International Business Machines Corporation, claiming as priority EP patent appl. EP 01811155.9 filed on Nov. 29, 2001, that is herewith incorporated by reference in its entirety.

BACKGROUND OF THE INVENTION

According to Kathleen A. Jackson, INTRUSION DETECTION SYSTEM (IDS) PRODUCT SURVEY, Version 2.1, Los Alamos National Laboratory 1999, Publication No. LA-UR-99-3883, Chapter 1.2, IDS OVERVIEW, intrusion detection systems attempt to detect computer misuse. Misuse is the performance of an action that is not desired by the system owner; one that does not conform to the system's acceptable use and/or security policy. Typically, misuse takes advantage of vulnerabilities attributed to system misconfiguration, poorly engineered software, user neglect or abuse of privileges and to basic design flaws in protocols and operating systems.

Intrusion detection systems analyze activities of internal and/or external users for explicitly forbidden and anomalous behavior. They are based on the assumption that misuse can be detected by monitoring and analyzing network traffic, system audit records, system configuration files or other data sources (see also Dorothy E. Denning, IEEE TRANSACTIONS ON SOFTWARE ENGINEERING, VOL. SE-13, NO. 2, February 1987, pages 222-232).

The types of methods an intrusion detection system can use to detect misuse can vary. Essentially, there are two main intrusion detection methods known, which are described for example in EP 0 985 995 A1 and U.S. Pat. No. 5,278,901.

The first method uses knowledge accumulated about attacks and looks for evidence of their exploitation. This method, which on a basic level can be compared to virus checking methods, is referred to as knowledge-based, also known as signature-based or pattern-oriented or misuse detection. A knowledge-based intrusion detection system therefore looks for patterns of attacks while monitoring a given data source. As a consequence, attacks for which signatures or patterns are not stored, will not be detected.

According to the second method a reference model is built, that represents the normal behavior or profile of the system being monitored and looks for anomalous behavior, i.e. for deviations from the previously established reference model. Reference models can be built in various ways. For example in S. Forrest, S. A. Hofineyr, A. Somayaji and T. A. Longstaff; A Sense of Self for Unix Processes, Proceedings of the 1996 IEEE Symposium on Research in Security and Privacy, IEEE Computer Society Press 1996, pages 120-128, normal process behavior is modeled by means of short sequences of system calls.

The second method is therefore referred to as behavior-based, also known as profile-based or anomaly-based. Behavior-based intrusion detection, which relies on the assumption that the "behavior" of a system will change in the event that an attack is carried out, therefore allows to detect previously unknown attacks, as long as they deviate from the previously established model of normal behavior. Under the condition that the normal behavior of the monitored system does not change, a behavior-based intrusion detection system will remain up-to-date, without having to collect signatures of new attacks.

However, since the behavior of a system normally changes over time, e.g. due to changes in the activities of authorized users or installation of new or updated system elements, without immediate adaptation of the used reference model deviations from the modeled behavior will frequently be detected without any intrusions taking place. Behavior-based intrusion detection systems will therefore normally produce a large number of false alarms (false positives) deriving from non-threatening events.

Knowledge-based intrusion detection systems tend to generate fewer false alarms. However, depending on the quality of the stored knowledge of known attacks and the condition of the monitored system these systems may also produce numerous false alarms which can not easily be handled by human system administrators. For example, some network applications and operating systems may cause numerous ICMP (Internet Control Message Protocol) messages (see Douglas E. Corner, INTERNETWORKING with TCP/IP, PRINCIPLES, PROTOCOLS, AND ARCHITECTURES, 4th EDITION, Prentice Hall 2000, pages 129-144), which a knowledge-based detection system may interpret as an attempt by an attacker to map out a network segment. ICMP-messages not corresponding to normal system behavior may also occur during periods of increased network traffic with local congestions.

It is further known that an intrusion detection system may interpret sniffed data differently than the monitored network elements, see Thomas H. Ptacek, Timothy N. Newsham, Insertion, Evasion, and Denial of Service: Eluding Network Intrusion Detection, Secure Network Inc., January 1998, which under certain conditions could also lead to false alarms.

False alarms, appearing in large numbers, are a severe problem because investigating them requires time and energy. If the load of false alarms in a system gets high, human system administrators or security personnel might become negligent. In Klaus Julisch, Dealing with False Positives in Intrusion Detection, RAID, 3rd Workshop on Recent Advances in Intrusion Detection, 2000, it is described that filters could be applied in order to remove false alarms. Filters can also use a knowledge-based approach (discarding what are known to be false positives) or a behavior-based approach (discarding what follows a model of normal alarm behavior). Either way, maintaining and updating models or knowledge bases of filters and intrusion detection systems requires further efforts.

It would therefore be desirable to create an improved method and a system for processing alarms triggered by a monitoring system such as an intrusion detection system, a firewall or a network management system in order to efficiently extract relevant information about the state of the monitored system or activities of its users.

It would further be desirable for this method and system to operate in the presence of a large amount of false alarms, which are received at a rate that can not be handled efficiently by human system administrators.

Still further, it would be desirable to receive the results of said data processing procedures, in a short form but with a high quality of information, that can easily be interpreted by human system administrators or automated post processing modules.

SUMMARY OF THE INVENTION

In accordance with the present invention there is now provided a method, a computer program element and a system according to claim 1, claim 14 and claim 15.

The method allows to process alarms triggered by a monitoring system such as an intrusion detection system, a firewall or a network management system in order to extract relevant information about the state of the monitored system or activities of its users.

In order to obtain relevant information about the state of the monitored system or activities of its users, a) similarity between alarms is evaluated,
b) similar alarms are grouped into so-called alarm clusters,
c) alarm clusters that satisfy a predetermined criterion, e.g. exceed a minimum number are summarized by so-called "generalized alarms" and
d) generalized alarms constituting the output of the method are forwarded for further processing.

In the event of high rates of alarm messages, possibly containing a high percentage of false alarms, human system administrators will not be confronted with a flood of messages with little significance. Instead, only generalized alarms, which are more meaningful and less in number, are presented to human system administrators. This fosters understanding of alarm root causes and facilitates the conception of an appropriate response to alarms (e.g. by suppressing false alarms in the future, or by repairing a compromised system component).

Key to alarm clustering is the notion of alarm similarity. Different definitions of alarm similarity are possible, but in a preferred embodiment, alarm similarity is defined as the sum of attribute similarities and attribute similarity is preferably defined via taxonomies. Examples of attributes include the alarm source, the alarm destination, the alarm type, and the alarm time. A taxonomy is an "is-a" generalization hierarchy that shows how attribute values can be generalized to more abstract concepts. Finally, two attribute values are all the more similar, the closer they are related by means of their taxonomies.

By way of illustration, a taxonomy on the time attribute might establish the following "is-a" hierarchy:

timestamp ts1 is-a monday and a monday is-a workday;
timestamp ts2 is-a tuesday and a tuesday is-a workday;
a workday is-a day of the week;
timestamp ts3 is-a sunday and a sunday is-a holiday;
a holiday is-a day of the week.

Given this taxonomy, timestamp t1 is more similar to t2 than to t3. This is because t1 and t2 are related via the concept "workday". In contrast, t1 and t3 are only related via the concept "day of the week", which is less specific, thus resulting in a smaller similarity value. Finally, as stated earlier, alarm similarity is defined as the sum of attribute similarities.

Alarm clusters can easily comprise thousands of alarms. Therefore, it is not viable to represent alarm clusters by means of their constituent alarms. Indeed, doing so would mean to overwhelm a recipient with a vast amount of information that is hard to make sense of. To solve this problem, alarm clusters are represented by so-called generalized alarms. Generalized alarms are like ordinary alarms, but their alarm attributes can assume higher-level concepts from the taxonomies. To continue the above example, the time-attribute of a generalized alarm might assume any of the values "monday", . . . , "sunday", "workday", "holiday", or "day of the week".

The rationale for clustering similar alarms stems from the observation that a given root cause generally results in similar alarms. Thus, by clustering similar alarms, it is attempted to group alarms that have the same root cause. Finally, generalized alarms provide a convenient vehicle for summarizing similar alarms in a succinct and intuitive manner. The end result is a highly comprehensible, extremely succinct summary of an alarm log that is very adequate for identifying alarm root causes. Identifying alarm root causes is of value as it is the basis for finding an appropriate response to alarms (such as shunning attackers at the firewall, or suppressing false positives in the future, etc.). In this way, the described invention offers an effective and efficient method for managing large amounts of alarms.

BRIEF DESCRIPTION OF THE DRAWINGS

Some of the objects and advantages of the present invention have been stated, others will appear when the following description is considered together with the accompanying drawings, in which:

FIG. 7 shows a table comprising generalized alarms.

DETAILED DESCRIPTION OF THE PREFERRED EMBODIMENTS

Figure 1:
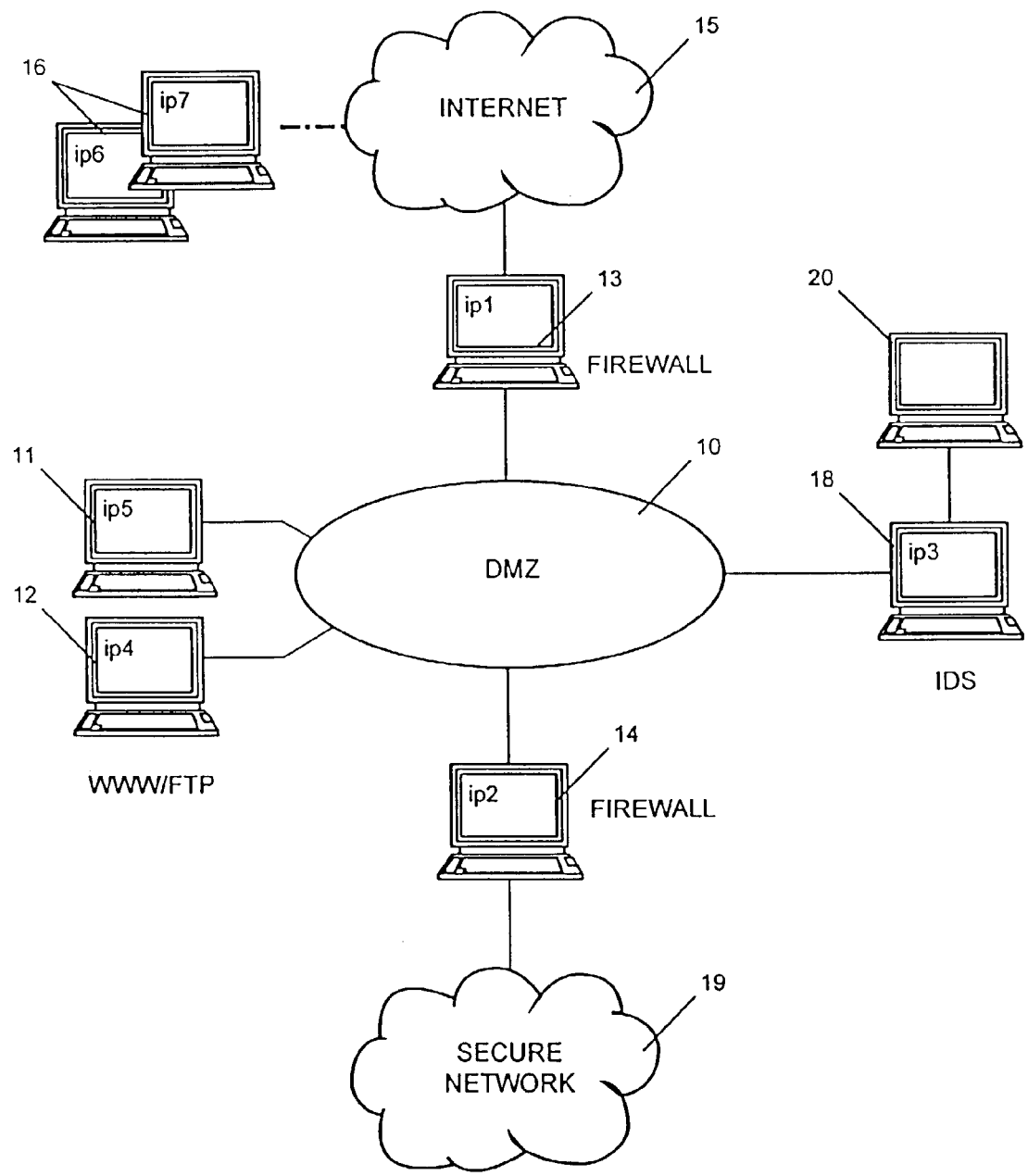
FIG. 1 shows a schematic view of a computer network topology comprising firewalls and a DMZ.

FIG. 1 shows a schematic view of a computer network topology comprising firewalls 13, 14 and a demilitarized zone 10, below referred to as DMZ. DMZ is a term often used when describing firewall configurations. The DMZ 10 is an isolated subnet between a secure network 19 and an external network such as the Internet 15. Clients 16 operating in the Internet 15 may access Web servers and other servers 11, 12 in the DMZ 10, which are provided for public access. The servers 11, 12 are protected to some degree by placing an outer firewall 13, often a packet-filtering router, between the Internet 15 and the servers 11, 12 in the DMZ 10. The outer firewall 13 forwards only those requests into the DMZ 10 which are allowed to reach the servers 11, 12. Further the outer firewall 13 could also be configured to block denial-of-service attacks and to perform network address translation for the servers 11, 12 in the DMZ 10. The inner firewall 14 is designed to prevent unauthorized access to the secure network from the DMZ 10 and perhaps to prevent unauthorized access from the secure network to the DMZ 10 or the Internet 15. Network traffic in the DMZ 10 is sensed and analyzed by an intrusion detection system 18 which, as described above, triggers alarms when detecting patterns of attacks or anomalous behavior.

In the examples presented below, alarms are modeled as tuples over a multidimensional space. The dimensions are called alarm attributes or attributes for short. Examples of alarm attributes include the source and destination IP address, the source and destination port, the alarm type which encodes the observed attack, and the timestamp which also includes the date.

Formally, alarms are defined as tuples over the Cartesian product $X_{1 \leq i \leq n}$ dom, where $\{A_1, \ldots, A_n\}$ is the set of attributes and dom is the domain (i.e. the range of possible values) of attribute $A_i$. Furthermore, for an alarm a and an attribute $A_i$, the projection $a[A_i]$ is defined as the $A_i$ value of alarm a. Next, an alarm log is modeled as a set of alarms. This model is correct if the alarms of alarm logs are pairwise distinct—an assumption made to keep the notation simple. Unique alarm-IDs can be used to make all alarms pairwise distinct.

$A_i$ shall be an alarm attribute. A tree $T_i$ on the elements of dom is called a taxonomy (or a generalization hierarchy). For two elements x, $\hat{x} \in$ dom, $\hat{x}$ is called a parent of x, and x a child of $\hat{x}$ if there is an edge $\hat{x} \rightarrow x$ in $T_i$. Furthermore, $\hat{x}$ is called a generalization of x if the taxonomy $T_i$ contains a path from $\hat{x}$ to x, in symbols: $x \leq \hat{x}$. The length of this path is called the distance $\delta x, \hat{x})$ between x and $\hat{x}$. $\delta(x, \hat{x})$ is undefined if $x \leq \hat{x}$ is not satisfied. Finally, $x \leq \hat{x}$ is trivially satisfied for $x = \hat{x}$, and $\delta(x, \hat{x})$ equals 0 in this case.

Figure 3:
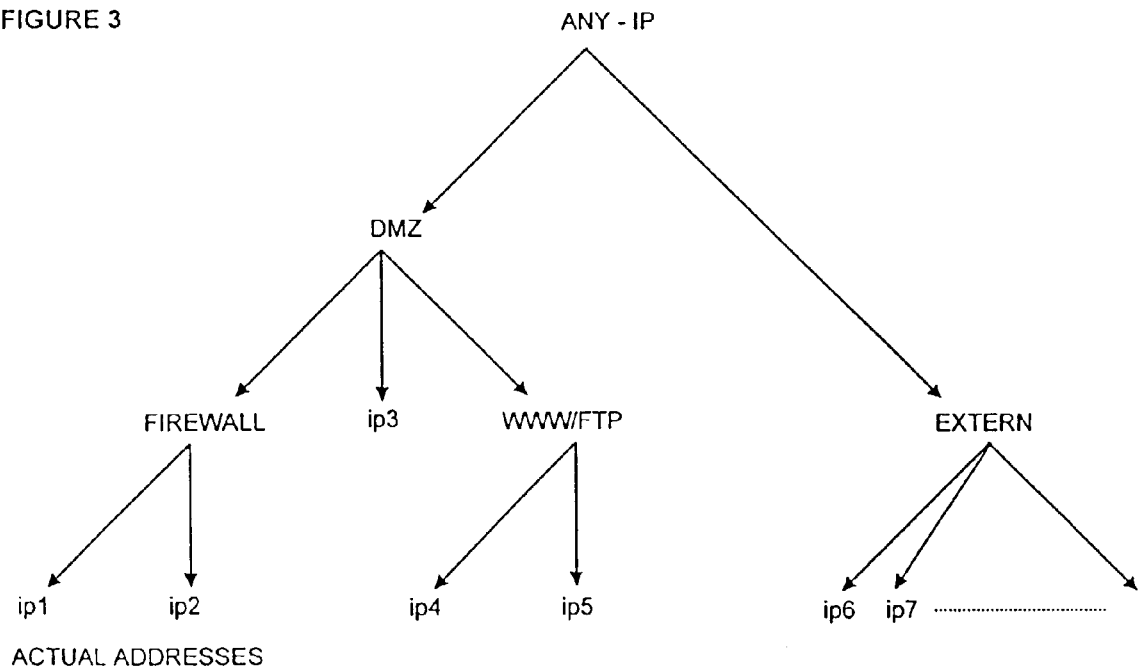
FIG. 3 shows a sample taxonomy, hierarchically listing the organization of IP-addresses of the network in FIG. 1.
Figure 4:
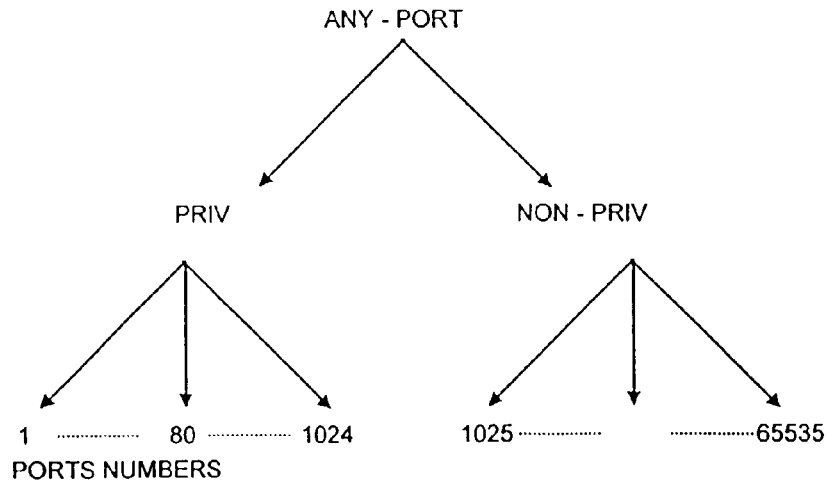
FIG. 4 shows a sample taxonomy, hierarchically listing the organization of port numbers.

By way of illustration, FIG. 1 shows a network topology and FIGS. 3 and 4 the taxonomies one might want to use for IP addresses and port numbers in this environment.

The domain of IP addresses is the union of "elementary" IP addresses (i.e. the set $\{p.q.r.s | p, q, r, s \in \{0, \ldots, 255\}\}$) and "generalized" IP addresses (i.e. the set $\{FIREWALL, WWW/FTP, DMZ, EXTERN, ANY\text{-}IP\}$).

Analogously, the domain of port numbers is $\{1, \ldots, 65535, PRIV, NON\text{-}PRIV, ANY\text{-}PORT\}$.

Next, according to FIG. 3, the IP address ip1 is a FIREWALL, is a DMZ machine, is any IP address. More succinctly, this relationship can be expressed as ip1≤FIREWALL≤DMZ≤ANY-IP.

Furthermore, $$\begin{aligned}\delta(ip1, ANY\text{-}IP) &= 1 + \delta(FIREWALL, ANY\text{-}IP) \\ &= 1 + 1 + \delta(DMZ, ANY\text{-}IP) \\ &= 1 + 1 + 1 + \delta(ANY\text{-}IP, ANY\text{-}IP) \\ &= 1 + 1 + 1 + 0 = 3.\end{aligned}$$

Finally, $\delta(ip1, ip2)$ is not defined because $ip1 \leq ip2$ is false.

Next, the notation is extended from attributes to alarms. To this end, a, $\hat{a} \in X_{1 \leq i \leq n}$ dom shall denote two alarms. The alarm $\hat{a}$ is called a generalization of alarm a if $a[A_i] \leq \hat{a}[A_i]$ holds for all attributes $A_i$. In this case, $a \leq \hat{a}$.

Furthermore, if $a \leq \hat{a}$ holds, then the distance $\delta(a, \hat{a})$ between the alarms a and $\hat{a}$ is defined as $$\delta(a, \hat{a}) := \sum_{i=1}^{n} \delta(a[A_i], \hat{a}[A_i])$$

If $a \leq \hat{a}$ is not satisfied, then $\delta(a, \hat{a})$ is undefined. Finally, in the case of $a \leq \hat{a}$, a is more specific than $\hat{a}$, and $\hat{a}$ is more abstract than a.

As a convention, the symbols $A_i, \ldots, A_n$ are used to stand for alarm attributes. Furthermore, the symbols $T_1, \ldots, T_n$ are reserved for taxonomies on the respective attributes. Finally, the symbol L will be used to denote an alarm log and the symbol G will be used to denote a cluster log.

Below, similarity is defined. To this end, $S \subseteq L$ shall denote a set of alarms a. The cover of S is the most specific alarm c, $$c \in X_{1 \leq i \leq n} \text{ dom}$$

to which all alarms a in S can be generalized. Thus, the cover c satisfies $\forall a \in S : a \leq c$, and there is no more specific alarm c' (c'≤c) that would also have this property. The cover of S is denoted by cover (S).

For example, according to the taxonomies shown in FIGS. 3 and 4, cover({(ip1,80),(ip4,21)})=(DMZ,PRIV).

Finally, the dissipation of S is defined as $$\Delta(S) := 1 \Big/ |S| \sum_{a \in S} \delta(a, \text{cover}(S)). \qquad (1)$$

Figure 2:
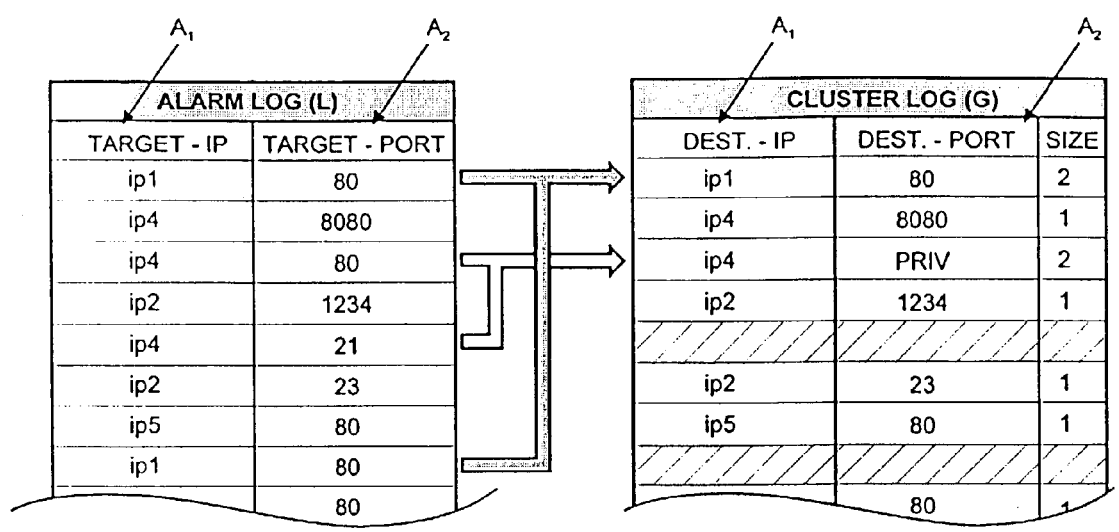
FIG. 2 shows a sample alarm log with unprocessed alarms and the corresponding generalized alarms in a cluster log; each generalized alarm covers, as indicated in the size field, a number of alarms of the alarm log.

It is verified that $\Delta(\{(ip1,80), (ip4,21)\})=1/2*(3+3)=3$ (cf. FIGS. 2,3,4). Intuitively, the dissipation measures the average distance between the alarms of S and their cover. The alarms in S are all the more similar, the smaller the value of $\Delta(S)$ is. Therefore, it is attempted to minimize dissipation in order to maximize intra-cluster alarm similarity.

Next, the alarm clustering problem is described. To this end, L shall be an alarm log, min-size∈N, N being the set of natural numbers, an integer, and $T_i$, i=1, . . . , n, a taxonomy for each attribute $A_i$ in L.

Definition 1 (Alarm Clustering Problem)

(L, min-size, $T_i, \ldots, T_n$.) shall be an (n+2)-tuple with symbols as defined above. The alarm clustering problem is to find a set $C \subseteq L$ that minimizes the dissipation Δ, subject to the constraint that |C|≥min-size holds. C is called an alarm cluster or cluster for short.

In other words, among all sets $C \subseteq L$ that satisfy |C|≥min-size, a set with minimum dissipation shall here be found. If there are multiple such sets, then anyone of them can be picked. Once the cluster C has been found, the remaining alarms in L\C can be mined for additional clusters. One might consider to use a different min-size value for L\C, an option that is useful in practice. Further, also another criterion may be defined for the completion of a cluster.

Imposing a minimum size on alarm clusters has two advantages. First, it decreases the risk of clustering small sets of unrelated but coincidentally similar alarms. Second, large clusters are of particular interest because identifying and resolving their root causes has a high payoff. Finally, the decision to maximize similarity as soon as the minimum size has been exceeded minimizes the risk of including unrelated alarms in a cluster.

Clearly, stealthy attacks that trigger fewer than min-size alarms do not yield any clusters. Here it is intended however, to identify a predominant root cause that accounts for a predetermined amount of alarms. By removing the root cause, ne number of newly generated alarms can be reduced. This reduction is of advantage as screening the reduced alarm stream for attacks is much more efficient.

For a practical alarm clustering method, the following result is relevant:

Theorem 1: The alarm clustering problem (L, min-size, $T_i, \ldots, T_n$.) is NP-complete. The proof can be obtained by reducing the CLIQUE problem to the alarm clustering problem.

Below, an approximation method for the alarm clustering problem will be described. Before, it is assumed that alarm clusters can be discovered. Then, the question arises how alarm clusters are best presented, e.g. to the system administrator. Alarm clusters can comprise thousands of alarms. Therefore, it is not viable to represent clusters by means of their constituent alarms. Indeed, doing so would mean to overwhelm the receiving system administrator with a vast amount of information that is hard to make sense of. To solve this problem, clusters are represented by their covers. Covers correspond to what is informally called "generalized alarms".

In order to obtain generalized alarms that are meaningful and indicative of their root cause, it is valuable to take advantage of several or even all alarm attributes. In particular, string and time attributes can contain valuable information, and the following discussion shows how to include these attribute types in this framework. For brevity, the discussion will rely on examples, but the generalizations are clear.

Figure 5:
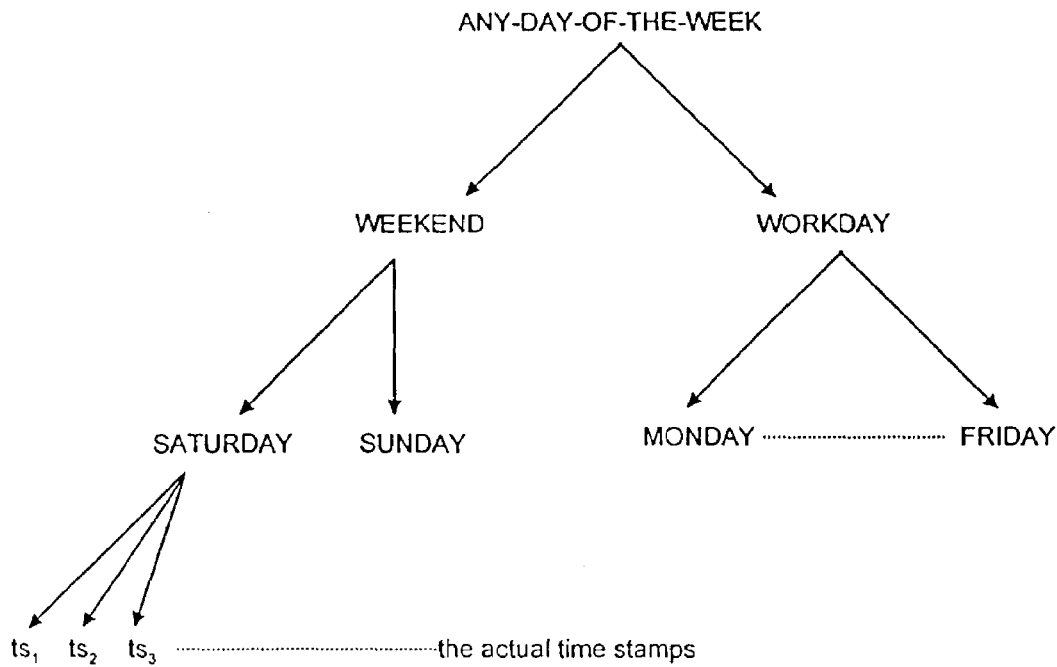
FIG. 5 shows a sample taxonomy, hierarchically listing the days of a week.
Figure 6:
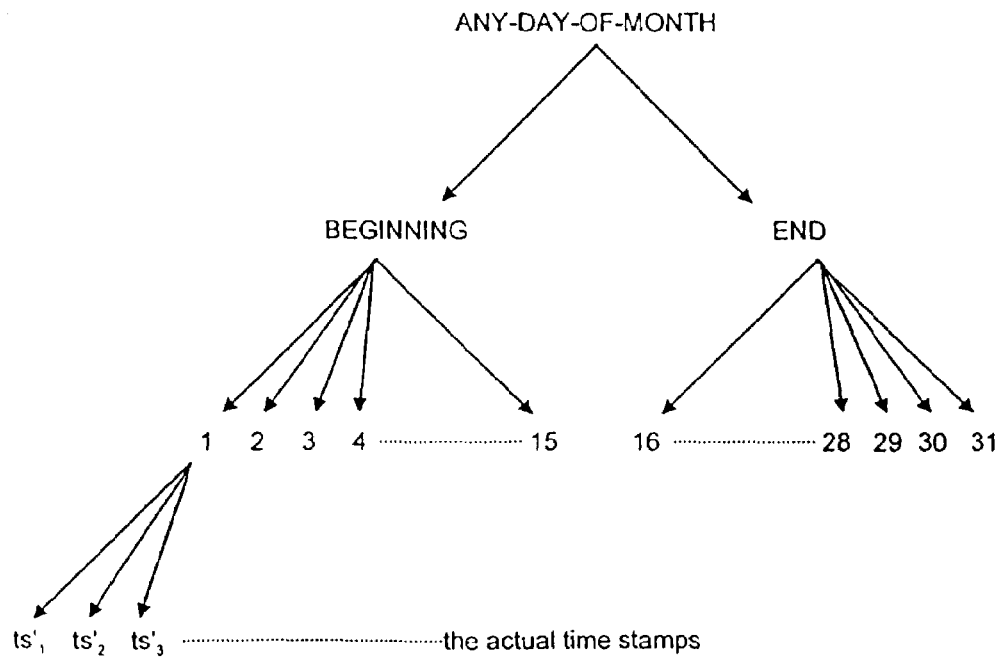
FIG. 6 shows a sample taxonomy, hierarchically listing the days of a month.

Time attributes are considered first. Typically, one wishes to capture temporal information such as the distinction between weekends and workdays, between business hours and off hours, or between the beginning of the month and the end of the month. To make the clustering method aware of concepts like these, one can use a taxonomy such as the ones in FIGS. 5 and 6. For example, the taxonomy of FIG. 5 shows that the time-stamp ts1 can be generalized to the concepts SATURDAY, WEEKEND, and ultimately, ANY-DAY-OF-WEEK.

String attributes are considered next. String attributes can assume arbitrary text values with completely unforeseeable contents. Therefore, the challenge lies in tapping the semantic information of the strings. This problem is solved by means of a feature extraction step that precedes the actual alarm clustering. Features are bits of semantic information that, once extracted, replace the original strings. Thus, each string is replaced by the set of its features. Subset-inclusion defines a natural taxonomy on feature sets. For example, the feature set $\{f1, f2, f3\}$ can be generalized to the sets $\{f1, f2\}$, $\{f1, f3\}$, or $\{f2, f3\}$, which in turn can be generalized to $\{f1\}$, $\{f2\}$, or $\{f3\}$. The next level is the empty set, which corresponds to "ANY-FEATURE".

One can select features that capture as much semantic information as possible, using well established techniques that support feature selection.

Given the NP completeness of alarm clustering, an approximation method has been developed as follows. An approximation method for the problem (L, min-size, $T_i, \ldots, T_n$.) finds a cluster $C \subseteq L$, that satisfies a predetermined criterion of $|C| \geq$ min-size, but does not necessarily minimize $\Delta$. The closer an approximation method pushes $\Delta$ to its minimum, the better.

The proposed approximation method is a variant of attribute-oriented induction (AOI). The modification according to the invention over known AOI is twofold: First, attributes are generalized more conservatively than by known AOI. Second, a different termination criterion is used, which is reminiscent of density-based clustering.

To begin with, the proposed approximation method directly constructs the generalized alarm c that constitutes the algorithm's output. In other words, the method does not make the detour over first finding an alarm cluster and then deriving its cover. The method starts with the alarm log L, and repeatedly generalizes the alarms a in L. Generalizing the alarms in L is done by choosing an attribute $A_i$ and replacing the $A_i$ values of all alarms by their parents in $T_i$. This process continues until an alarm c has been found to which at least min-size of the original alarms a can be generalized. This alarm constitutes the output of the method. Below, the resulting method is shown.

Input: An alarm clustering problem (L, min-size, $T_i, \ldots, T_n$.)

Output: An approximation solution for (L, min-size, $T_i, \ldots, T_n$.)

Method:

TABLE 1

Alarm clustering method

```
 1:  G := L,;                                    // Make a copy of L
 2:  loop forever {
 3:    for each alarm c ∈ G do {
 4:      z := number of alarms a ∈ L, with a ≼ c;
 5:      if z ≧ min −size then terminate and return alarm c;
 6:    }
 7:    use heuristics to select an attribute A_i, i ∈ {1, ..., n};
 8:    for each alarm c ∈ G do           // Generalize c[A_i]
 9:      c[A_i] := parent(c[A_i], T_i);
10:  }
```

In more detail, line 1 of table 1 makes a copy of the initial alarm log L. This is done because the initial alarm log L is used in line 4. Below, the copy of the alarm log L is called cluster log G since it will contain generalized alarms c that cover clusters C of alarms a contained in the alarm log L. The alarm log L therefore contains the initial unchanged alarms a while the cluster log contains covers or generalized alarms c that may change during the generalization process.

In line 5, the method terminates when a generalized alarm c has been found to which the predetermined criterion applies, i.e. here at least min-size alarms a∈L can be generalized. If the method does not terminate, then the generalization step (lines 8 and 9) is executed. Here, selecting an attribute $A_i$ is guided by the following heuristic:

For each attribute $A_i$, $f_i \in N$, with N being the set of natural numbers, shall be maximum with the property that there is an alarm c*∈G such that a[$A_i$]≼c*[$A_i$] holds for f of the original alarms a∈L. If $f_i$ is smaller than min-size, then it is clear that one will not find a solution without generalizing $A_i$ and, therefore, select $A_i$ for generalization. This will not eliminate the optimal solution from the search space. If, on the other hand, $f_i \geq$ min-size holds for all attributes, then the attribute $A_i$ with the smallest $f_i$ value is selected.

Although further heuristics are applicable, it has been found that the above heuristic works well in practice, and it is the heuristic of the preferred embodiment.

Based on the above, one could conceive a completely different approximation method, for example one that is based on partitioning or hierarchical clustering. The above method is advantageous for its simplicity, scalability, and noise tolerance.

FIG. 2 shows an alarm log L with unprocessed alarms a and corresponding generalized alarms c in a cluster log G; each generalized alarm covers, as indicated in the size field, a number of alarms a in the alarm log L. As described above the cover of a set S of alarms, i.e. the cover of an alarm cluster, is the most specific alarm c, $$c \in X_{1 \leq i \leq n} \text{ dom}$$

to which all alarms a in S can be generalized. The cluster log G therefore contains generalized alarms c, each with a size field indicating the number of alarms a covered in the alarm log L.

Before an attribute of an alarm is selected for generalization as indicated in line 7 of the alarm clustering method, generalized alarms c are preferably created for alarms that are identical. The section of the alarm log L shown in FIG. 2 contains two identical alarms with TARGET-IP equal ip1 and TARGET-PORT equal 80. The generalized alarm c covering these two elementary alarms comprises therefore the same attributes $A_1$, $A_2$, and a size field indicating the number of alarms covered. It is possible that the number z of alarms covered after this preliminary generalization already satisfies the predetermined criterion that exists for terminating and triggering the forwarding of the generalized alarms c. If the predetermined criterion is satisfied, e.g. the number of alarms a covered exceeds the value of min-size, being the minimum size, also referred to as minimum number, of the alarm clustering method will return one or more generalized alarms c (see line 5 of the method) before generalization of alarm attributes has taken place.

However, as long as z<min-size, an attribute $A_i$ is selected which is generalized for each alarm a∈G. As shown in FIG. 2, generalization of attribute $A_2$ (TARGET-PORT) would result in a generalized alarm ({(ip4,80),(ip4,21)})=(ip4,PRIV) covering the two alarms (ip4,80),(ip4,21) as indicated in the size field.

Another example is given in FIG. 7, which shows the cluster log G with the generalized alarms c of the thirteen largest alarm clusters C found in an alarm log L that has been taken from a commercial intrusion detection system over a time period of one month, and that contained 156380 alarm messages. The IDS sensor was deployed in a network that is isomorphic to the one shown in FIG. 1.

In the example of FIG. 7, alarms are modeled as 7-tuples. In detail, the individual alarm attributes $A_i$ are the source and destination IP address, the source and destination port, the alarm type, the timestamp, and the context field which is optional, but when present, contains the suspicious network packet.

For IP addresses and port numbers, the taxonomies in FIGS. 3 and 4 can be used. For timestamps, the taxonomies in FIGS. 5 and 6 can be used. No taxonomy is defined for the alarm types. Finally, for the context field (a string attribute) frequent substrings are used as features. More precisely, defining V:=<a[Context]|a∈L> to denote the multi-set (or bag) of values that the context field assumes in the alarm log L, then, preferably the Teiresias method is run on V in order to find all substrings that have a predetermined minimum length and minimum frequency. These substrings are the features and each original string s is replaced by the most frequent feature that is also a substring of s. Thus, all feature sets have size one. Finally, each feature set can only be generalized to the "ANY-FEATURE" level. A strength of this feature extraction method is that the resulting features are better understandable and interpretable, thus increasing the overall understandability of alarm clusters.

Each line of the cluster log G describes one generalized alarm c indicating in the "Size" column the size of the covered cluster C. The size of the cluster is the number of covered alarms. The AT column shows the Alarm Types, for which mnemonic names are provided below the table. Within the cluster log G, "ANY" is generically written for attributes that have been generalized to the root of their taxonomy $T_i$. It is worth noting that only alarm types 1 and 2 have context attributes. Therefore, the context attribute is undefined for all the other alarm types. Also, the port attributes are occasionally undefined. For example, the ICMP protocol has no notion of ports. As a consequence, the port attributes of alarm type 5 are undefined. Finally, the names ip1 ip2, . . . refer to the clients and servers in FIG. 1.

The clusters in cluster log G shown in FIG. 7 cover 95% of all alarms resulting in a summary of almost the entire alarm log. Moreover, using this summary for root cause discovery is a simplification over using the original alarm log L. Having understood the alarm root causes, the future alarm load can therefore significantly be decreased by a) filtering alarms that with a given probability have a benign root cause,
b) shunning an attacker at a firewall of the computer network,
c) fixing a configuration problem, and/or
d) repairing a compromised system component.

What has been described above is merely illustrative of the application of the principles of the present invention. Other arrangements can be implemented by those skilled in the art without departing from the spirit and scope of protection of the present invention. In particular, the application of the inventive method is not restricted to processing alarms sensed by an intrusion detection system. The method can be implemented in any kind of decision support application, that processes amounts of data.

The method can be implemented by means of a computer program element operating in a system 20 as shown in FIG. 1 that is arranged subsequent to a monitoring system. As described in U.S. Pat. No. 6,282,546 B1, a system designed for processing data provided by a monitoring system may be based on known computer systems having typical computer components such as a processor and storage devices, etc. For example the system 20 may comprise a database which receives processed data and which may be accessed by means of an interface in order to visualize processed alarms.

The invention claimed is:

1. A method for processing alarms, that have been triggered by a monitoring system, comprising the steps of:
   a) entering alarms triggered by a monitoring system into an alarm log;
   b) evaluating similarity between the alarms;
   c) grouping similar alarms into alarm clusters;
   d) creating generalized alarms that cover the clustered alarms, the step of creating generalized alarms including copying the alarm log to a cluster log and for each alarm in the cluster log, repeating the following steps,
      e1) counting the number of covered alarms to include alarms that are equal to or more specific than the generalized alarm;
      e2) if the number of covered alarms exceeds a predetermined minimum number, then terminate repeating and forward said generalized alarm for further processing;
      e3) selecting, based on a heuristic, an attribute of the alarms in the cluster log; and
      e4) for each alarm of a cluster log replacing the selected attribute by a more general attribute; and
      e5) returning to step e1).

2. The method according to claim 1, wherein the predetermined criterion is selected to comprise exceeding a minimum number.

3. The method according to claim 1, wherein similar alarms are grouped according to an algorithmic procedure.

4. The method according to claim 1, wherein said step of evaluating similarity comprises a step of defining the similarity between the alarms based on a taxonomy on attributes.

5. The method according to claim 4, wherein said step of evaluating similarity comprises a step of selecting the taxonomy as one of directed acyclic graphs and trees.

6. The method according to claim 4, wherein said step of evaluating similarity comprises a step of replacing the attribute by the next more general attribute as listed in the corresponding taxonomy.

7. The method according to claim 1, further including a step of replacing the content of the attribute that is a string attribute by a set of corresponding features before the clustering.

8. The method according to claim 7, wherein substrings of a predetermined minimum length and frequency are used as a feature set.

9. The method according to claim 7, wherein the step of replacing the content of the attribute that is a string-attribute comprises generalizing the string attribute by replacing its set of features by a sub-set thereof.

10. The method according to claim 1, comprising the step of investigating the forwarded generalized alarm to identify a root cause.

11. The method according to claim 1, comprising the step of decreasing a future alarm load, by a step selected from the group consisting of:
   a) filtering the alarms that with a given probability have a benign root cause;
   b) shunning an attacker at a firewall of a computer network;
   c) fixing a configuration problem; and d) repairing a compromised system component.

12. The method of claim 1, wherein the step of replacing the selected attribute by a more general attribute further includes:
   selecting a taxonomy group from a plurality of taxonomy groups that represents the selected attribute.

13. The method of claim 1, wherein The step of replacing further includes:
   selecting an attribute from a plurality of alarm attributes; and
   replacing the selected attributed for all alarms in the cluster log by the selected attribute's taxonomy.

14. The method of claim 3, wherein the algorithmic procedure includes at least an approximation method.

15. The method of claim 1, wherein said more generalized attribute is an attribute of a parent alarm in a tree hierarchy of alarms.

* * * * *